US008838742B2

(12) United States Patent
Le Leannec et al.

(10) Patent No.: US 8,838,742 B2
(45) Date of Patent: Sep. 16, 2014

(54) METHOD AND DEVICE FOR PRE-PROCESSING REQUESTS RELATED TO A DIGITAL SIGNAL IN AN ARCHITECTURE OF CLIENT-SERVER TYPE

(75) Inventors: Fabrice Le Leannec, La Gretais (FR); Ioana Donescu, Bretagne (FR)

(73) Assignee: Canon Kabushiki Kaisha, Tokyo (JP)

( * ) Notice: Subject to any disclaimer, the term of this patent is extended or adjusted under 35 U.S.C. 154(b) by 2299 days.

(21) Appl. No.: 10/549,158

(22) PCT Filed: Apr. 7, 2004

(86) PCT No.: PCT/IB2004/001714
§ 371 (c)(1),
(2), (4) Date: Sep. 15, 2005

(87) PCT Pub. No.: WO2004/091220
PCT Pub. Date: Oct. 21, 2004

(65) Prior Publication Data
US 2006/0184607 A1      Aug. 17, 2006

(30) Foreign Application Priority Data

Apr. 9, 2003   (FR) ..................................... 03 04402

(51) Int. Cl.
*G06F 15/16*        (2006.01)
(52) U.S. Cl.
USPC ........... 709/219; 709/217; 709/218; 709/205; 709/231; 709/232
(58) Field of Classification Search
USPC ........................................................ 709/219
See application file for complete search history.

(56) References Cited

U.S. PATENT DOCUMENTS

| 6,442,658 | B1 | 8/2002 | Hunt et al. | 711/158 |
| 6,463,508 | B1 * | 10/2002 | Wolf et al. | 711/133 |
| 7,027,086 | B1 * | 4/2006 | Ozawa et al. | 348/220.1 |
| 7,092,983 | B1 * | 8/2006 | Tyrrell, III | 709/201 |

(Continued)

FOREIGN PATENT DOCUMENTS

| WO | WO 01/41446 A1 * | 6/2001 | |
| WO | WO 01/80561 A1 | 10/2001 | ............... H04N 7/12 |
| WO | WO 01/95513 A1 | 12/2001 | ............... H04B 1/66 |

OTHER PUBLICATIONS

Taubman, D., "Remote Browsing of JPEG2000 Images," IEEE, Proceedings 2000 International Conference on Image Processing (ICIP), NY, USA, vol. 2 of 3, pp. 229-232 (2002); XP010607302, ISBN 0-7803-7622-6.

(Continued)

*Primary Examiner* — Noel Beharry
(74) *Attorney, Agent, or Firm* — Fitzpatrick, Cella, Harper & Scinto

(57) ABSTRACT

This method of transmission of an animation in a digital image by a first server containing a descriptive file of the animation to a client, an animation being defined by a series of portions of a digital image according to a plurality of requests to be received from the client, comprises the steps of, at reception by the first server of a request from the client on the animation descriptive file, transmission (908) of the descriptive file to the client and to a second server. The second server is enabled to prepare (912) appropriate responses to a series of client requests deduced from the descriptive file and anticipating the plurality of requests to be received from the client.

20 Claims, 9 Drawing Sheets

(56) References Cited

U.S. PATENT DOCUMENTS

| | | | |
|---|---|---|---|
| 2002/0010761 A1* | 1/2002 | Carneal et al. | 709/219 |
| 2002/0091665 A1* | 7/2002 | Beek et al. | 707/1 |
| 2004/0039810 A1 | 2/2004 | Donescu et al. | 709/223 |
| 2004/0175046 A1* | 9/2004 | Gormish | 382/232 |

OTHER PUBLICATIONS

McFarland, D., "*Animation in a Flash: Don't Slave Over Animations—Let Macromedia Flash Do the Work*," Macworld, PC World Communications, vol. 17, No. 6 (2000), pp. 99-101, XP001021654, ISSN 0741-8647.

Devillers, S. "*XML and XSLT Modeling for Multimedia Bitstream Manipulation*" (2001), Abstract, XP002245841.

Li, J., et al., "*A Virtual Media (Vmedia) Access Protocol and Its Application in Interactive Image Browsing*," Multimedia Computing and Networking, Proceedings of the SPIE, vol. 4312, No. 10 (2001), Abstract, XP002243461.

Taubman, D., "*Proposal and Implementation of JPIP (Jpeg2000 Internet Protocol) in Kakadu v3.3*," Retrieved from the Internet: <URL:http//www.kakadusoftware.com/jpip-kakadu-superceded.pdf>, pp. 1-37, XP002260543.

* cited by examiner

METHOD AND DEVICE FOR PRE-PROCESSING REQUESTS RELATED TO A DIGITAL SIGNAL IN AN ARCHITECTURE OF CLIENT-SERVER TYPE

The present invention relates to a method and device for pre-processing requests related to a digital signal in an architecture of client-server type.

It lies in the field of systems for progressive transmission of data from a server to a client.

It is described here more particularly, but in non-limiting manner, in its application to digital signals representing images in a format according to the JPEG2000 standard.

In the context of the integration of portions of a JPEG2000 compressed image into an animation of, for example, the Macromedia Flash type, and of the transmission of that animation by a server to a client, in a client-server architecture, the Flash animation format provides in particular the possibility of including predefined animations.

Part 9 of the JPEG2000 standard, called JPIP (JPEG2000 Interactive Protocol), provides a protocol for transferring portions of JPEG2000 images. This protocol provides syntax for requests and for responses, termed JPIP requests and JPIP responses.

Consequently, the progressive transmission, from a server to a client, of an animation of Flash type consisting of a series of portions of a JPEG2000 image may be performed through a series of JPIP requests sent out by the client and processed by the server.

At the server, it is sought to minimize the processing time of a set of JPIP requests corresponding to a predefined animation such as mentioned above, in order to minimize the time for downloading such an animation by the client.

The software known as Kakadu is dedicated to the processing of JPEG2000 images, enables the server to construct a cache which is ready to form JPIP response messages and transmit them to the client. However, the data stored in the cache consists of codeblocks, which are compressed representations of an elementary rectangular portion of an image possibly transformed into sub-bands. The codeblocks are adapted to be encapsulated into packets. Consequently, the server must not only generate JPEG2000 packet headers but also the headers of the JPIP messages to transmit data to the client. This increases the processing time of the JPIP requests, which is precisely what it is sought to avoid.

The object of the present invention is to remedy this drawback.

To that end, the present invention provides a method of transmission of an animation in a digital image by a first server containing a descriptive file of the animation to a client, an animation being defined by a series of portions of a digital image according to a plurality of requests to be received from the client, this transmission method comprising the steps of:

at reception by the first server of a request from the client on the animation descriptive file, transmission of the descriptive file to the client and to a second server, the second server being enabled to prepare appropriate responses to a series of client requests deduced from the descriptive file and anticipating the plurality of requests to be received from the client.

The present invention thus makes it possible to optimize the responsiveness of a server in relation to requests corresponding to an animation in a digital image that is predefined and known in advance by the server.

The descriptive file enables a complete description to be obtained of an animation made up of portions of images. The client will then be able to formulate requests about the portions which it is missing.

Furthermore, the method according to the invention makes it possible to avoid overloading the random access memory of the server and to limit the permanent memory load of the server to the payload data which have a high probability of being requested in the future by clients.

In a first particular embodiment, the responses prepared by the second server are return message headers each accompanied by a pointer to the beginning of a segment of payload data to associate with the header, the segment of payload data being stored at the second server.

Thus, the prepared responses occupy less memory space on the second server, since they contain only the message headers to transmit and an equal number of pointers to the file containing the animation.

In a second particular embodiment, the responses prepared by the second server are messages each comprising a header and a body constituted by compressed data.

Thus, the second server merely transmits these already formed responses when it receives requests from the client. The response time of the second server to the client is further reduced with respect to the first embodiment since the time for extraction of the payload data from the original file is eliminated.

In a third particular embodiment, the method further comprises a step consisting of inserting the responses in a file containing the animation.

This makes it possible to considerably reduce the number of return trips between the client and the server for transmitting the animation.

According to a particular feature, the method further comprises a step consisting of fragmenting the payload data segment.

This step makes it possible to take into account the state of the client's cache at the moment of forming the definitive response messages intended for the client and thus makes it possible to avoid transmitting to the client data already stored in its cache.

The fragmenting step may consist in cutting up a series of bytes of the payload data segment into at least two portions if the size of that series of bytes exceeds a predetermined threshold.

It is thus possible to finely control the rate of the data transmitted to the client.

In a preferred application of the invention, the image is encoded according to the JPEG2000 standard.

According to a particular feature, the animation is of the Flash type and the aforementioned descriptive file is encapsulated in that animation.

According to a particular feature, the method according to the invention implements the JPIP transfer protocol (JPEG2000 Interactive Protocol).

With the same object as that mentioned above, the present invention also provides a device for transmission of an animation in a digital image by a first server containing a descriptive file of the animation to a client, an animation being defined by a series of portions of a digital image according to a plurality of requests to be received from the client, this transmission device comprising:

a unit for transmission, at reception by the first server of a request from the client on the animation descriptive file, of the descriptive file to the client and to a second server, the second server being enabled to prepare appropriate responses to a series of client requests deduced from the descriptive file and anticipating the plurality of requests to be received from the client.

The present invention also relates to a communication apparatus comprising a device as above.

The invention also relates to:
an information storage means storing instructions of a computer program and which can be read by a computer or a microprocessor, making it possible to implement a method as above, and
a partially or totally removable information storage means, which can be read by a computer or a microprocessor, storing instructions of a computer program, making it possible to implement a method as above.

The invention also relates to a computer program product able to be loaded into a programmable apparatus and comprising sequences of instructions for implementing a method as above, when that program is loaded and executed by the programmable apparatus.

As the particular features and advantages of the device, the communication apparatus, the different storage means and of the computer program product are similar to those of the method according to the invention, they are not repeated here.

Other aspects and advantages of the invention will appear from reading the following detailed description of particular embodiments, given by way of non-limiting example. The description refers to the accompanying drawings, in which.

Figure 3:
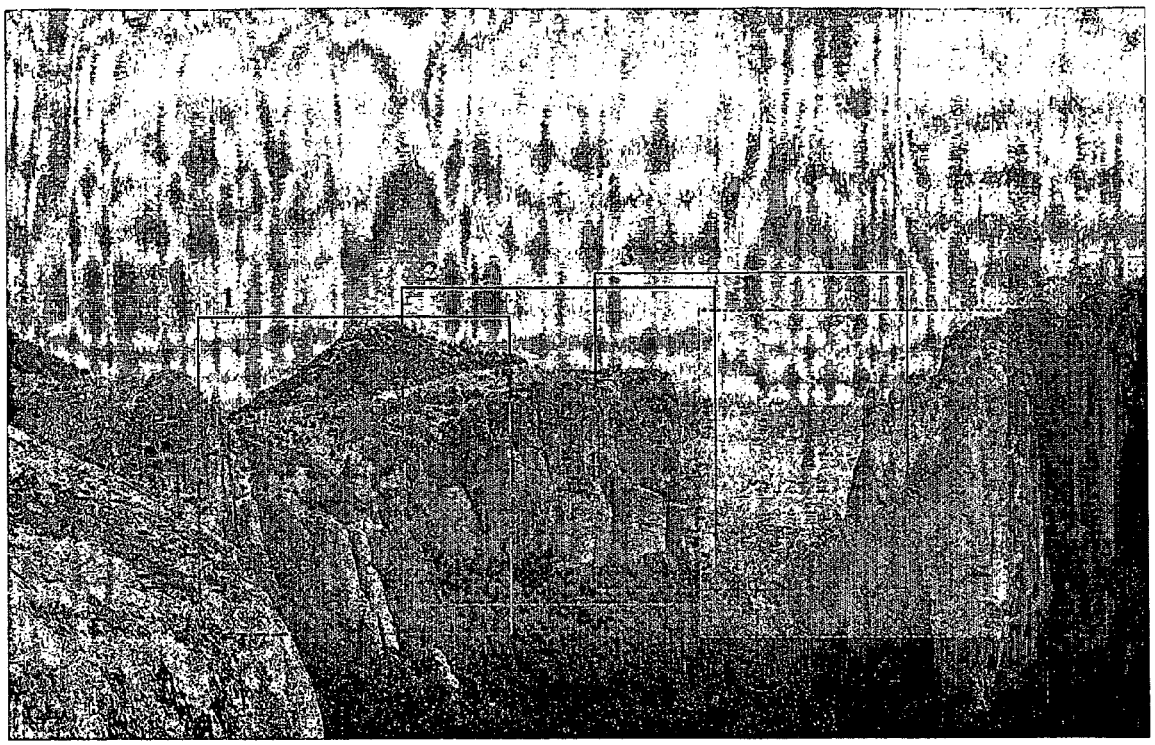
Figure 4:
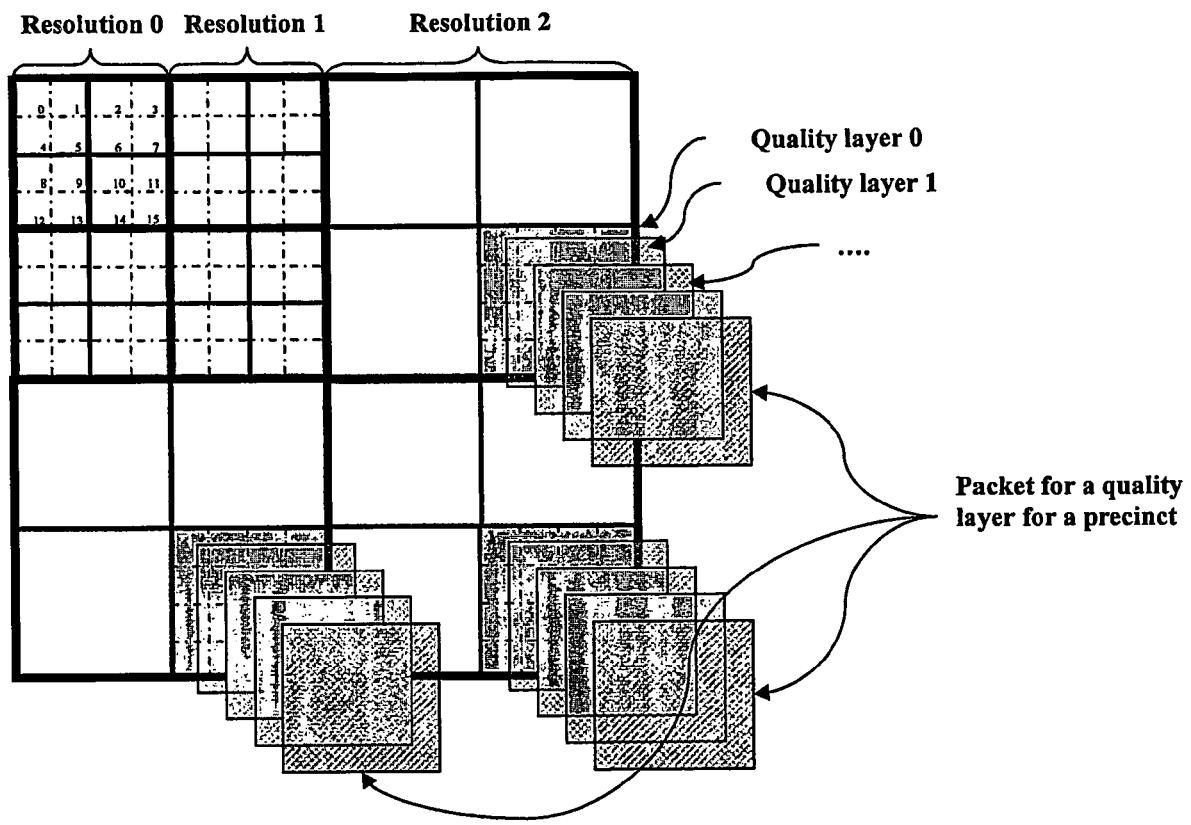
Figure 5:
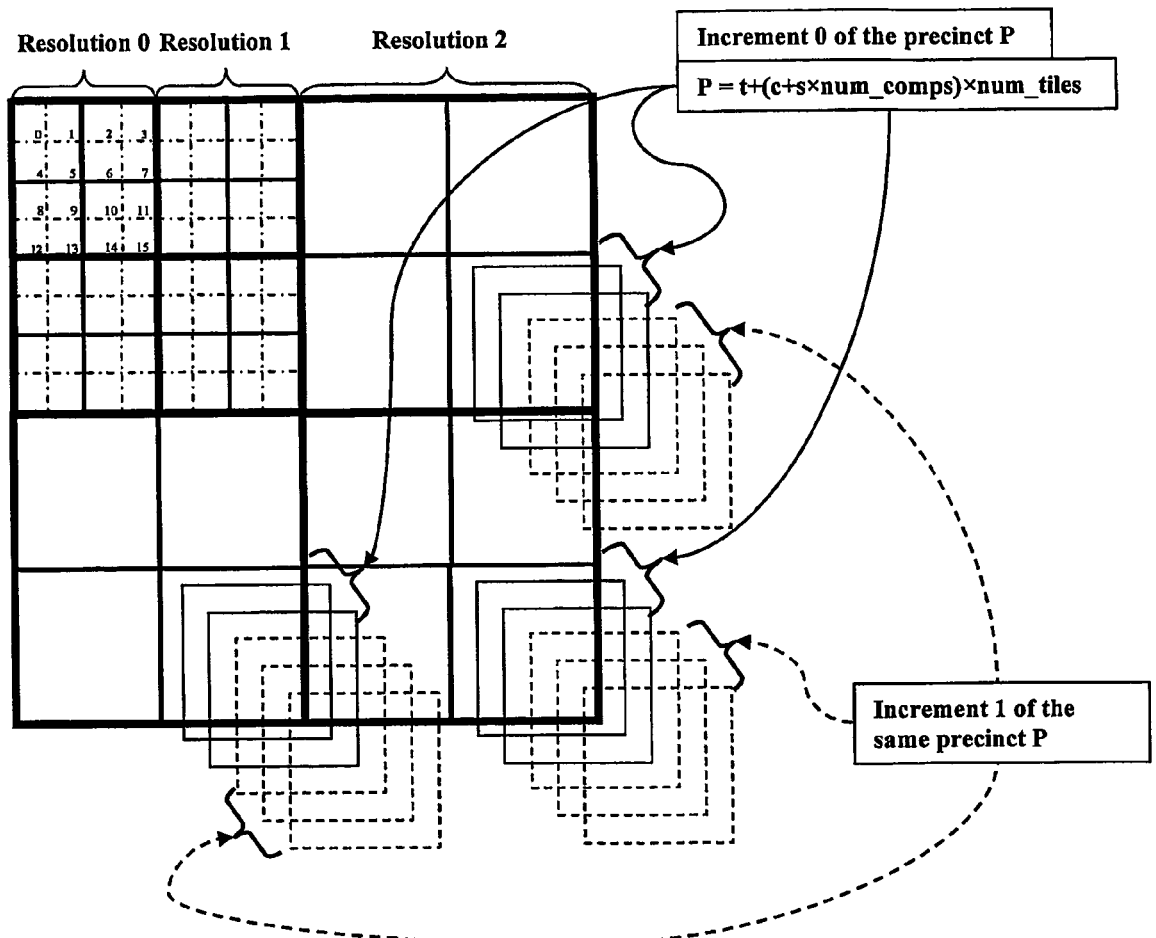
Figure 6:
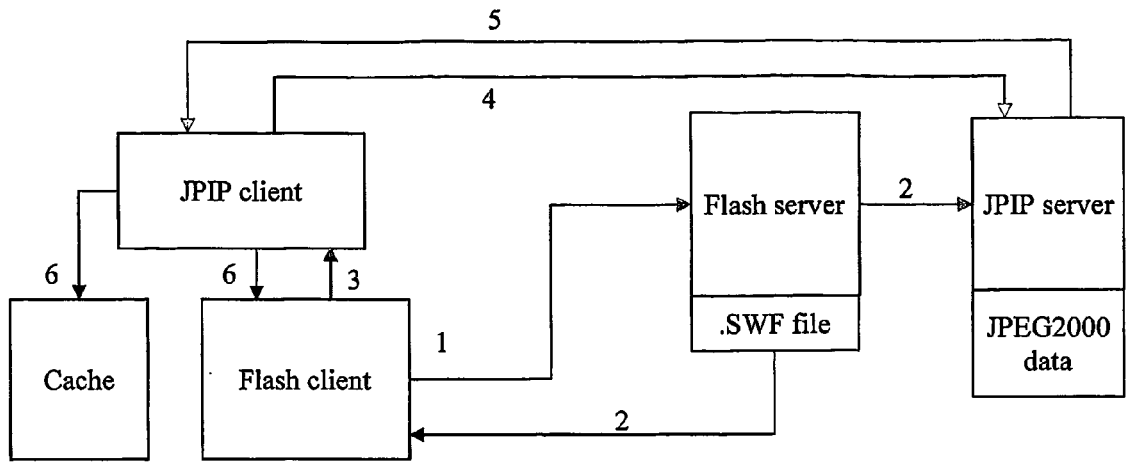
Figure 7:
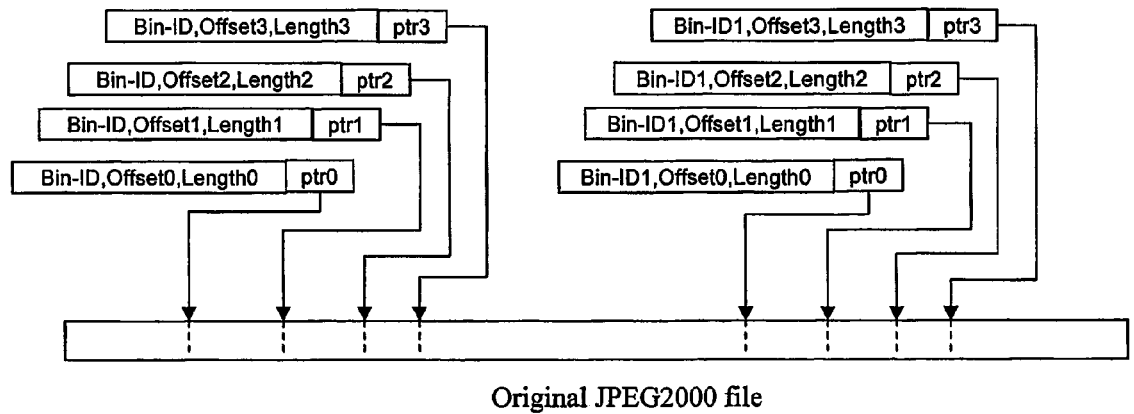
Figure 8:
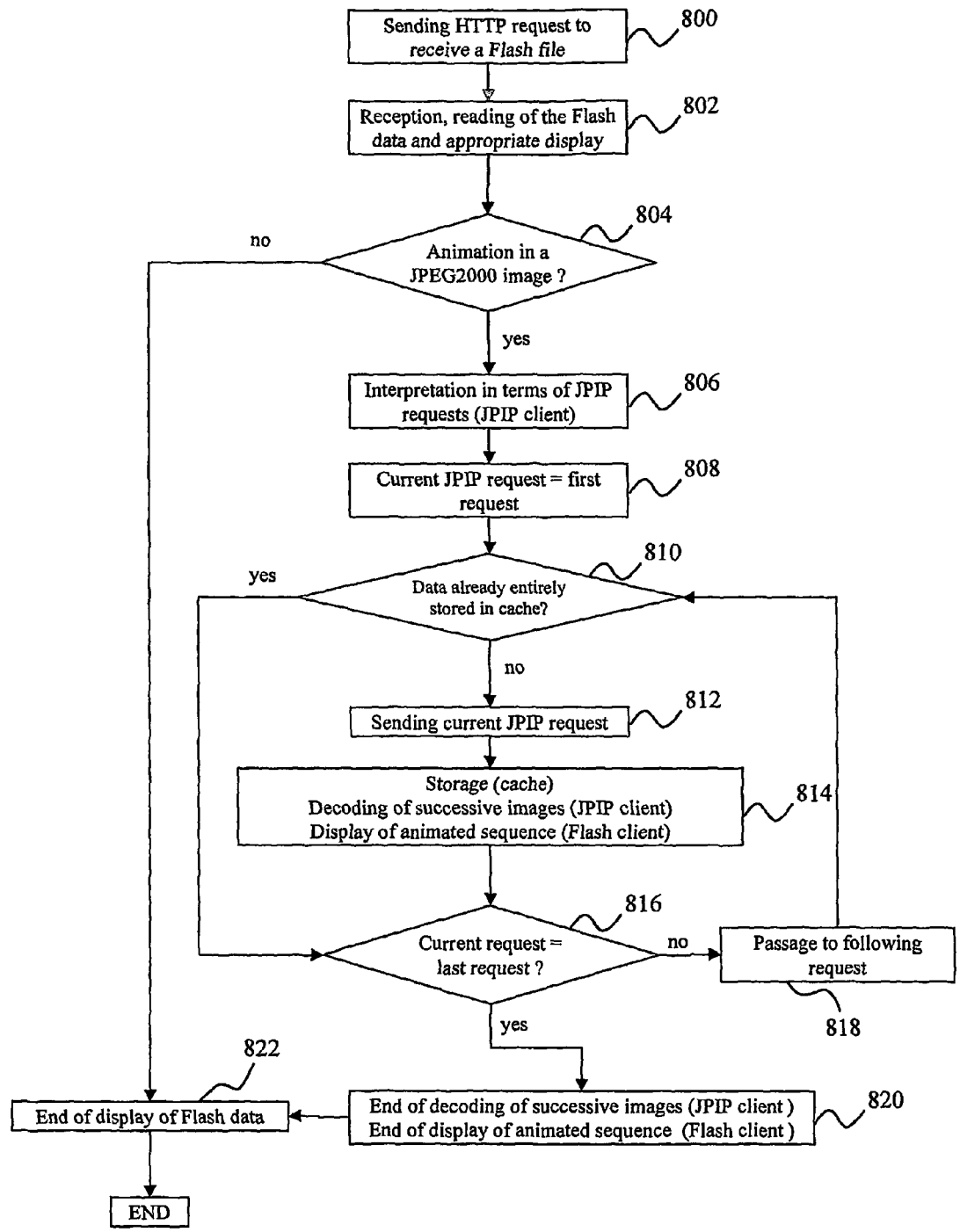
Figure 9:
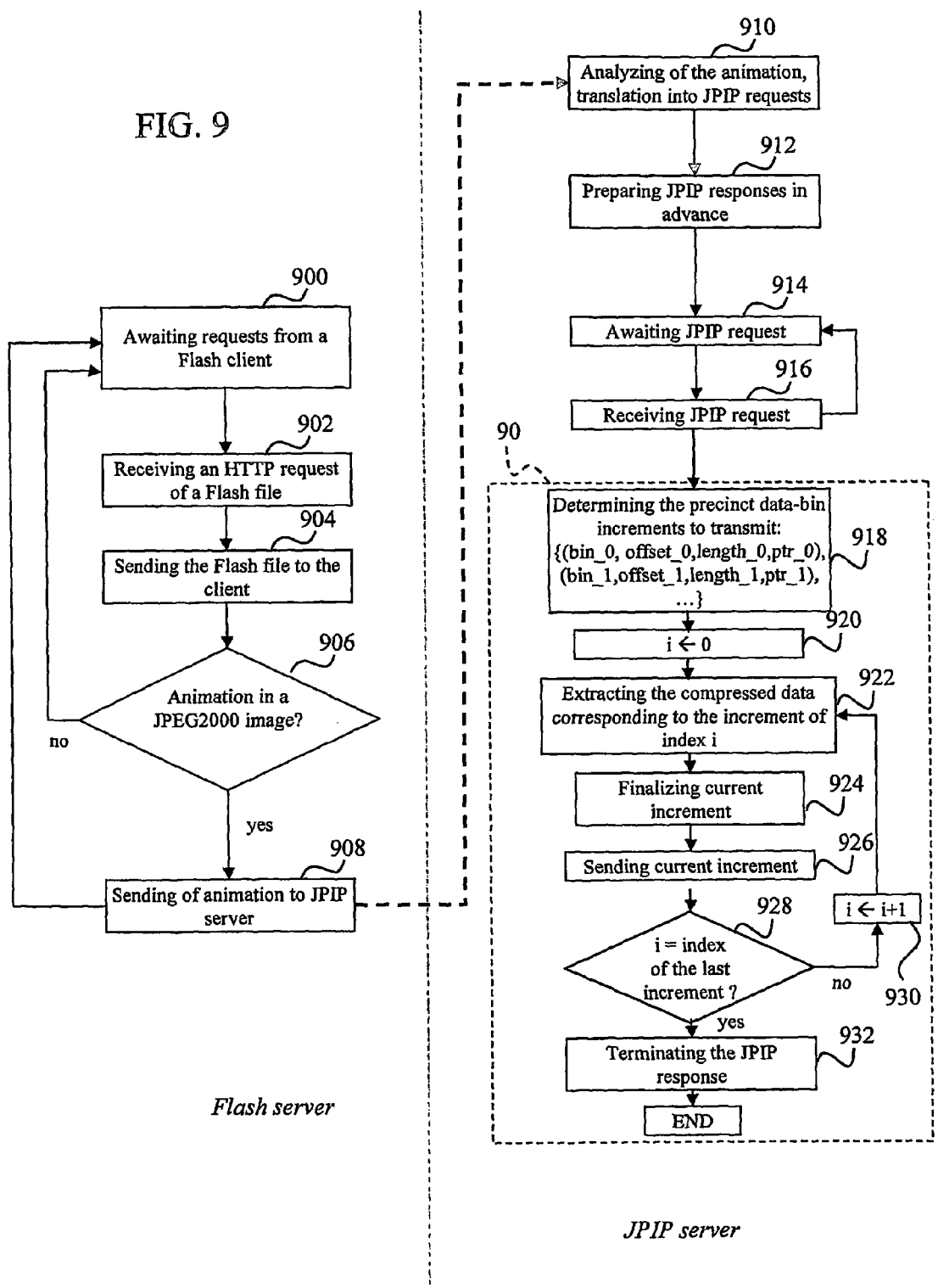
Figure 10:
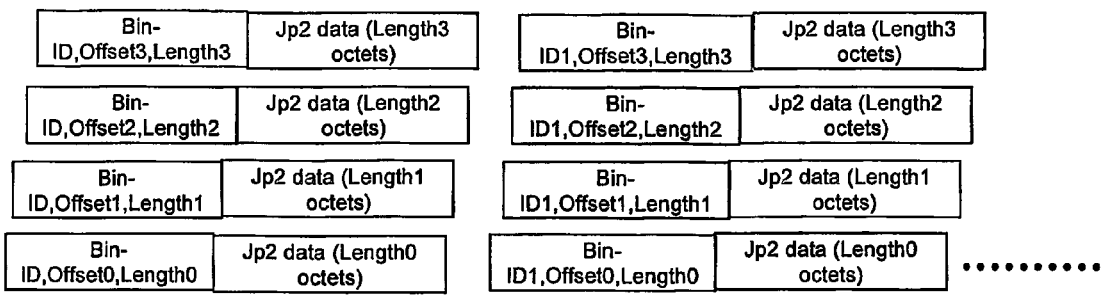
Figure 11:
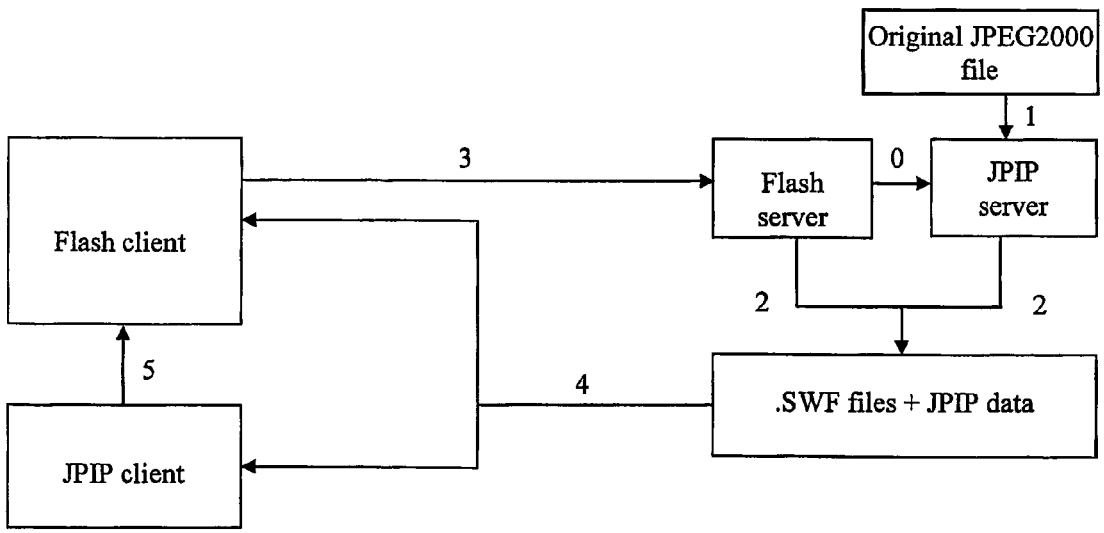

FIG. 3 provides an example of a series of portions of a JPEG2000 image liable to be transmitted by a server to a client in accordance with the present invention;

FIG. 4 illustrates the concept of precinct;

FIG. 5 illustrates the concept of precinct data-bin increment;

FIG. 6 is a block diagram illustrating a first particular embodiment of the method according to the present invention;

FIG. 7 is a diagram of the content of the partial JPIP responses prepared in advance for a Flash animation, in the first embodiment;

FIG. 8 is a flow diagram illustrating the main steps of the operation of the client in the first embodiment;

FIG. 9 is a flow diagram illustrating the main steps of the operation of the server in the first embodiment;

FIG. 10 is a diagram of the content of the JPIP responses prepared in advance for a Flash animation, in a second particular embodiment of the invention; and FIG. 11 is a block diagram illustrating a third particular embodiment of the invention.

A reminder will first of all be given of certain basic concepts relating to the data manipulated, on the one hand, in accordance with the JPEG2000 standard, and on the other hand in accordance with the JPIP protocol.

In the JPEG2000 standard, a file is composed of an optional JPEG2000 preamble, and a codestream comprising a main header and at least one tile.

A tile represents, in compressed form, a rectangular portion of the original image considered. Each tile is formed of a tile header, and a set of compressed image data called the tile bitstream.

Each tile bitstream comprises a sequence of packets. Each packet contains a header and a body. The body of a packet contains at least one codeblock, which, as indicated above, is a compressed representation of an elementary rectangular portion of an image possibly transformed into sub-bands. The header of each packet, on the one hand sums up the list of the codeblocks contained in the body under consideration and on the other hand contains compression parameters specific to each of these codeblocks. Each codeblock is compressed at a plurality of incremental quality levels: a basic layer and refinement layers. Each level or layer of quality of a codeblock is contained in a distinct packet.

A packet of a tile bitstream of a JPEG2000 file thus contains a set of codeblocks corresponding to a given tile, component, resolution level, quality level and precinct.

The portion of codestream corresponding to a tile can be divided into several contiguous segments termed tile-parts. In other words, a tile contains at least one tile-part. A tile-part contains a header (the tile-part header) and a sequence of packets. The division into tile-parts is made at boundaries between packets.

The JPIP protocol enables JPEG2000 file portions to be transferred. Various classes of entities of a JPEG2000 file, also termed data-bins, are provided by the future JPIP standard:

meta data-bin: consists of the series of consecutive bytes of the bitstream (byte-range) contributing to a given set of meta-information on a JPEG2000 compressed image;

main header data-bin: consists of the byte-range of the initial JPEG2000 bitstream contributing to the main header of the JPEG2000 file;

tile header data-bin: consists of the byte-range of the initial JPEG2000 bitstream contributing to a tile header of the original JPEG2000 image;

precinct data-bin: in JPIP terminology, a precinct consists of a set of packets of those various quality layers of the image which correspond to the same spatial position;

tile data-bin: consists of a byte-range contributing to the same tile-part.

Each class has a unique identifier "Class-Id". A JPIP response consists of a header paragraph in accordance with the HTTP protocol, followed by a series of JPIP messages or data-bin increments. Each response message consists of a byte-range, each byte contributing incrementally to a given data-bin. It is constituted by a header and a body. The header of a message contains the following fields: "Bin-Id", "[, Csn]", "Msg-Offset", "Msg-Length" and "[, Aux]".

The object of the fields Bin-Id and [, Csn] is to uniquely identify the data-bin to which the message considered contributes. They transport the following three items of information:

the index of the codestream to which the data-bin belongs, when the initial JPEG2000 contains several codestreams;

the identifier of the class (Class-Id) of the data-bin considered;

the identifier of the data-bin within the class to which it belongs or "In-Class-id".

The fields Msg-Offset and Msg-Length which follow in the header of the message indicate the bytes transported by the payload data contained in the JPIP message. Thus, the data-bin identified by the beginning of the header corresponds to a segment of data contained in the initial JPEG2000 file. The field Msg-Offset indicates the position of the first byte of the payload data of the data-bin in that data segment. The field Msg-Length indicates the number of bytes of payload data contained in the data-bin and extracted from the segment of data cited above from the position Msg-Offset.

Finally, the body of each message is constituted by a portion of Msg-Length bytes of the payload data transported by the data-bin. This portion of data is extracted from the original JPEG2000 bitstream, and corresponds to the byte-range of the bitstream (Msg-Offset, Msg-length) specified in the message header.

The requests for image data, according to the JPIP protocol, are constituted by several types of field:

the viewing window fields indicate to the server the current region of interest desired by the client. These fields include in particular the resolution level of the image associated with the region, the position of the window in the image, the size of the window (height and width), the components of the image included in the region of interest. Furthermore, the future JPIP standard provides for several optional parameters, useful for controlling the quantity of data contained in the response from the server. These parameters may limit the maximum number of bytes of payload data to return for the region considered, the maximum number of quality layers to return or the image quality factor to satisfy for the region of interest;

fields relating to the client's cache provide the server with information relating to the cache of the client sending the request:

model=<model-elements>

This instruction indicates to the server how to update the cache model which it maintains for a given client, within a given session. Each data-bin of the "model-elements" string indicates, according to a syntax defined by JPIP, an element of the client's cache, which may be preceded by the subtraction sign '−'. The elements preceded by '−' designate data-bins that the client has withdrawn from its cache. The others are additive and indicate data-bins that the client possesses and has stored in its cache. This type of instruction is solely valid for a so-called "stateful server" (this concept is defined later).

need=<bin-descriptors>

This instruction indicates to the server that only the data-bin increments indicated, and pertinent to the region of interest, form part of the client request. This instruction applies solely to a so-called "stateless server" (this concept is defined later).

It is assumed here that the data are transferred from the server to the client in the form of header data (meta data-bins, main header data-bins and tile header data-bins) and compressed data in the form of precinct data-bin increments or tile data-bin increments. In other words, a particular non-limiting case is taken here in which the JPIP data returned from the server to the client conform to the media-type JPP-STREAM.

In accordance with the invention, at the JPIP server there are prepared appropriate JPIP responses to the series of JPIP requests corresponding to a Flash animation. This is because the Flash file containing the animation considered is initially located on a Flash file server, which may be identical to the JPIP server considered. Consequently, the server already knows the animation contained in the file before transmitting the animation to the client. The server can thus deduce the series of JPIP requests liable to be transmitted to it by a client when the user wishes to view the animation.

The present invention is based on this assumption and makes it possible to prepare in advance the JPIP responses adapted to the series of JPIP requests deduced from the animation considered. Thus, when the server receives JPIP requests from a client, it already has available the corresponding pre-formatted JPIP response and only has to transmit it to the client considered. This therefore minimizes the processing time of JPIP requests corresponding to a predefined Flash animation known by the server.

The preparation of the JPIP responses may take various forms, corresponding to different embodiments of the invention provided.

A first possible form of response pre-formed by the server consists of JPIP return message headers (cf. the description above of the classes of data-bin), each followed by a pointer to the position in the JPEG2000 file of the beginning of the segment of payload data to associate with the header to terminate the JPIP message. Thus, on reception of a JPIP request, the server only has to extract the payload data from the file for each increment to be transmitted and to concatenate them following the header of the corresponding JPIP message. An advantage of this first embodiment lies in that the pre-formed responses occupy a limited space in memory or on the hard disk of the server, since they only contain the JPIP message headers to be transmitted and as many pointers to the JPEG2000 file. This first embodiment is described in more detail below in connection with FIGS. 6 to 9.

A second embodiment of the invention consists of entirely constructing JPIP response messages as described above. These entirely constructed JPIP messages thus each contain both a header and a body constituted by compressed data of the original signal. The advantage of this second embodiment is that the server only has to transmit these already formed responses when it receives JPIP requests from the client. The advantage with respect to the first embodiment is a reduced response time of the server, corresponding to the elimination of the time for extracting payload data from the original file. On the other hand, this embodiment requires a larger storage space for the server's cache. This second embodiment is described in more detail below in connection with FIG. 10.

A third embodiment of the invention provided consists of constructing complete JPIP response messages at the server, and of inserting them directly into the file containing the Flash animation. This embodiment assumes a particular use is made of the JPIP protocol, in which the basic paradigm, similar to that of HTTP and consisting of exactly associating a server response with a client request, is no longer respected. Nevertheless, a great advantage of this scenario of "streaming" type of the Flash animation is the absence of requests on the part of the client. This makes it possible to considerably reduce the number of return trips between the client and the server for transmitting the entire animation. This third embodiment is described in more detail below in connection with FIG. 11.

Figure 1:
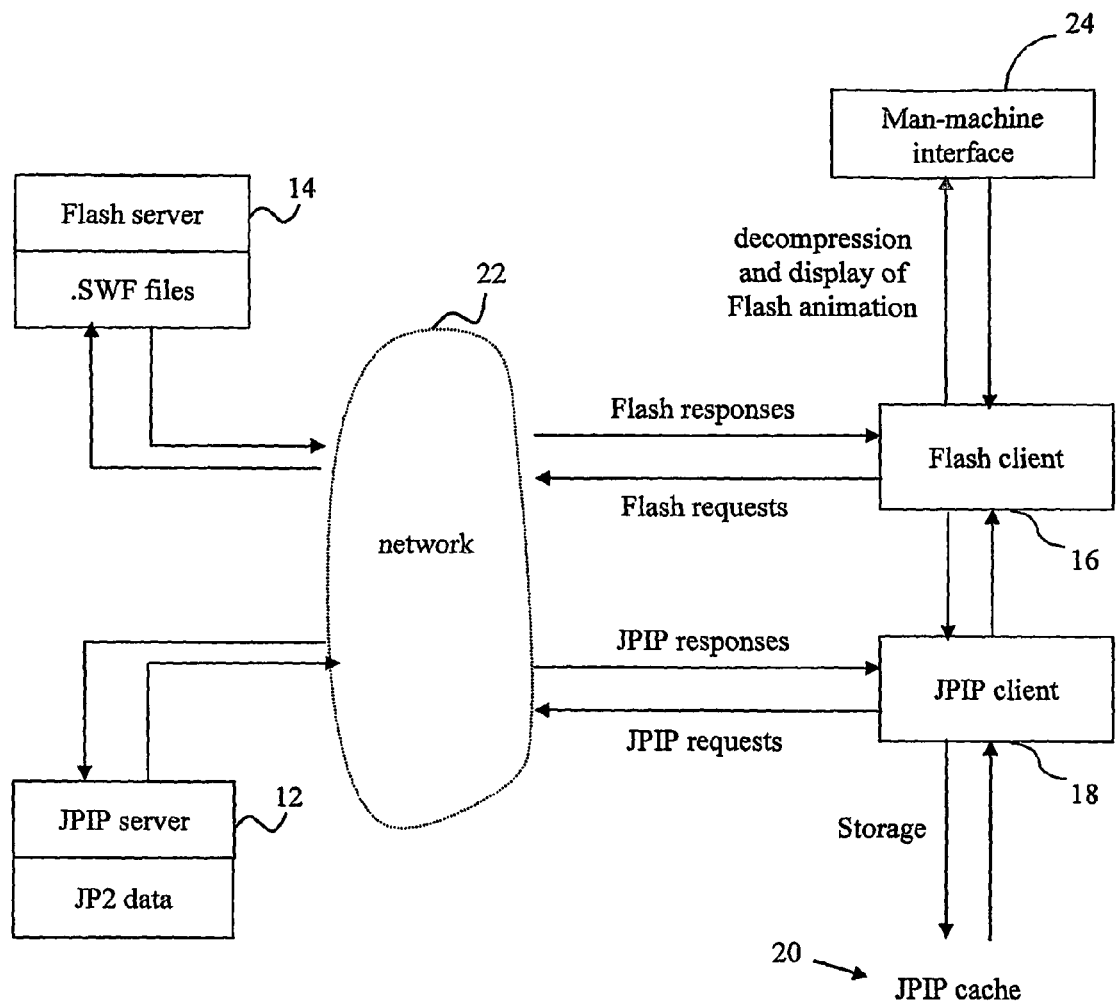
FIG. 1 is a diagram of the interactions between the different entities participating in the implementation of the invention, in a particular embodiment.

FIG. 1 illustrates the context in which the present invention applies. A typical scenario of use of the invention implies that there is a JPIP server 12 and a Flash file server 14, possibly located on the same machine, and a client.

The client is constituted by a Flash client 16 and a JPIP client 18. The Flash client 16 is capable of retrieving data representing a Flash animation from the Flash server 14 via a communication network 22, then of decompressing and displaying that animation by means of a man-machine interface 24. The JPIP client 18 is capable of sending JPIP requests, of receiving JPIP responses from the JPIP server 12, and of storing them in a cache 20.

A typical scenario consists initially, for the Flash client 16, of retrieving a Flash file from the Flash server 14, this Flash file containing a predefined animated sequence of images. This sequence consists of a series of portions of a JPEG2000 image or images, such as that illustrated by way of non-limiting example in FIG. 3. The sequence consists of a series of successive rectangular regions of interest, numbered from 1 to 4 in the drawing. From the user's point of view, the rendition of this animation, by means of the software Flash-Player, will appear as a progressive panning across of the landscape represented in FIG. 3. This sequence, described in the form of an appropriate script, is then interpreted in terms of JPIP requests by the JPIP client 18. The latter transmits successive JPIP requests to the JPIP server 12 which correspond to the desired animation. The JPIP server 12 then processes those requests in order and sends back JPIP responses to the JPIP client 18 accordingly.

The JPIP data received in response are stored on the fly in the cache 20, useful for avoiding any retransmission of JPIP data already transmitted.

Figure 2:
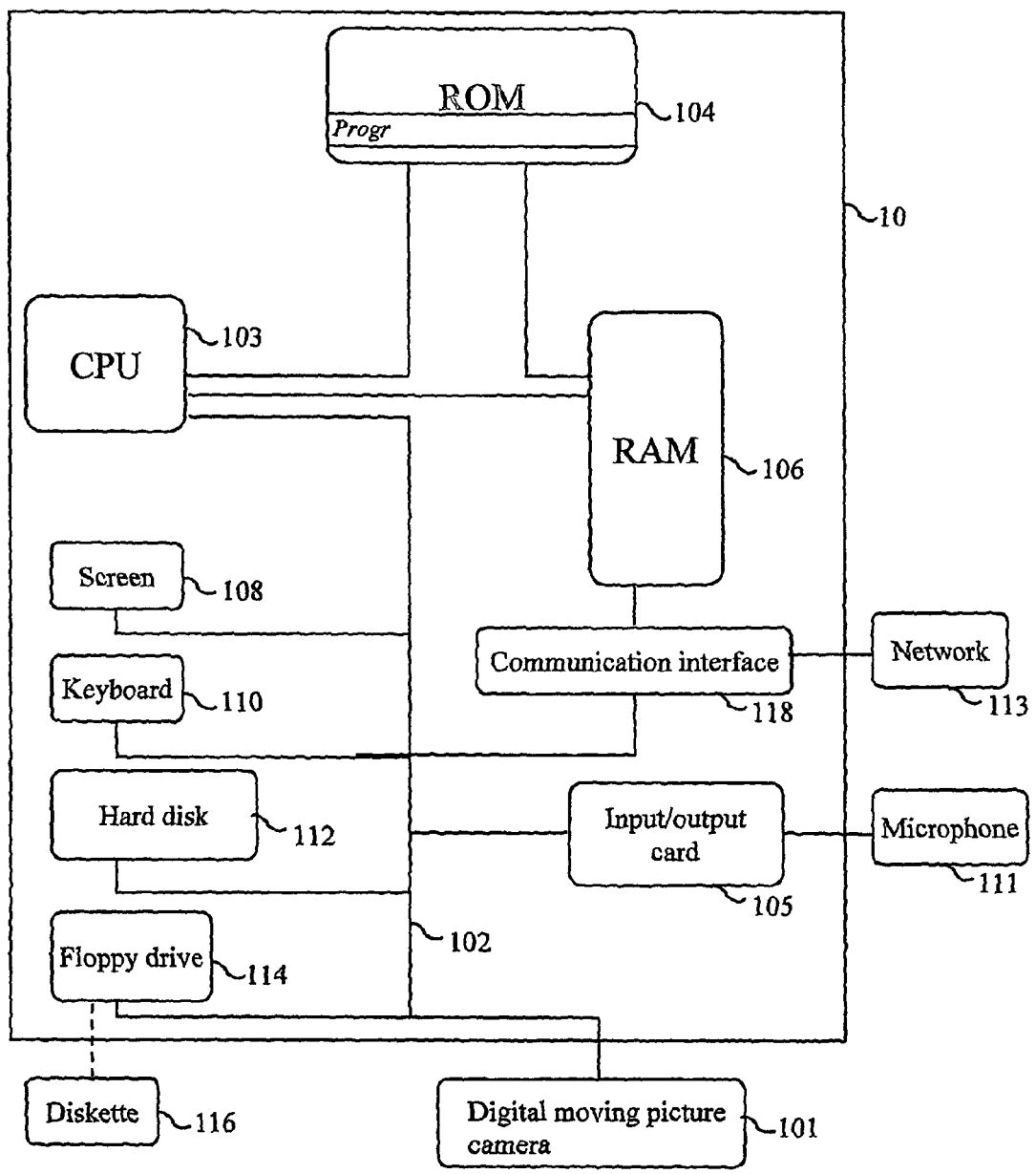
FIG. 2 is a diagram of a device implementing the present invention, in a particular embodiment.

According to the chosen embodiment represented in FIG. 2, a device implementing the invention is for example a microcomputer 10 connected to different peripherals, for example a digital moving picture camera 101 (or a scanner, or any means of acquiring or storing an image) connected to a graphics card and supplying information to be compressed according to the invention.

The device 10 comprises a communication interface 118 connected to a communication network 113 able to transmit digital data to be compressed or to transmit data compressed by the device. The device 10 also comprises a storage means 112 such as a hard disk. It also comprises a floppy drive 114. A diskette 116, as well as the hard disk 112, can contain data compressed according to the invention as well as the code of the invention which, once read by the device 10, will be stored on the hard disk 112. As a variant, the program enabling the device to implement the invention can be stored in read only memory 104 (referred to as ROM in the drawing). As a second variant, the program can be received in order to be stored in an identical fashion to that described previously via the communication network 113.

The device 10 is connected to a microphone 111 via an input/output card 105. The data to transmit according to the invention will in this case consist of audio signal.

This same device has a screen 108 for viewing the data to be decompressed (in the case of the client) or for serving as an interface with the user, who will be able to parameterize certain modes of execution of the server or of the client, using a keyboard 110 or any other means (a mouse for example).

A central processing unit 103 (CPU) executes the instructions relating to the implementation of the invention, which are stored in a file ("Progr" in the drawing) in read only memory 104 or in the other storage means. On powering up, the decompression programs stored in a non-volatile memory, for example the ROM 104, are transferred into a random-access memory RAM 106, which will then contain the executable code of the invention, as well as registers for storing the variables necessary for implementing the invention.

Naturally, the diskettes may be replaced by any type of non-transitory computer-readable storage medium, such as CD-ROM, DVD-ROM or memory card. In more general terms, an information storage means, which can be read by a computer or microprocessor, integrated or not into the device, and which may possibly be removable, stores a program implementing the method of execution of the server or of the client.

A communication bus 102 affords communication between the different elements included in the microcomputer 10 or connected to it. The representation of the bus 102 is not limiting and, in particular, the central processing unit 103 is liable to communicate instructions to any element of the microcomputer 10 directly or via another element of the microcomputer 10.

FIG. 4 illustrates the concept of precinct in a JPEG2000 image. As shown in the drawing, a precinct is a grouping of codeblocks of the sub-bands of the same resolution level and corresponding to the same spatial region of the image. Moreover, the image is composed of a plurality of quality levels or layers. The portion of the bitstream corresponding to a quality layer and a precinct form a contiguous series of bytes, termed a packet of the JPEG2000 bitstream.

In other words, in terms of JPEG2000 bitstream, a precinct may be viewed as a pile of successive packets. The latter contribute incrementally to the quality of reconstruction of the codeblocks contained in the precinct.

FIG. 5 illustrates the concept of precinct data-bin increment. In all that follows, it is considered that the data returned by the JPIP server belongs to the precinct increment class mentioned above (type of data conforming to the JPP-STREAM type defined by JPIP). Nevertheless, the principle of the invention is the same if tile data-bin increments were to be considered.

As FIG. 5 shows, a precinct increment corresponds to a byte-range contributing to the same precinct. Two distinct precinct increments are represented in the drawing.

In the drawing, each precinct increment contains several packets. This is not systematic, since the server has the liberty to choose the quantity of payload data to insert in a precinct increment. Consequently, a precinct increment may contain solely a portion of a packet, or several packets, and is not obliged to commence or to terminate at the boundary of a packet.

Each precinct increment is designated by an identifier P, which is calculated from:
- t, the index of the tile in the image;
- c, the index of the component in the image;
- s, the sequence number of the precinct in its tile throughout the resolution levels;
- num_comps, the total number of components; and
- num_tiles, the total number of tiles.

The formula for calculating P is given in the drawing.

The block diagram of FIG. 6 illustrates the method provided in a first embodiment of the invention. It shows successive steps (identified by order numbers in the drawing) of the scenario envisaged in that embodiment.

Firstly, the Flash client sends a request to the Flash server for retrieving a Flash file (arrow 1). The Flash server sends the Flash data to the Flash client (arrow 2 from the Flash server to the Flash client). Furthermore, it detects the presence of an animation in the desired Flash file, consisting of a path within a JPEG2000 image, such as represented earlier (FIG. 3). It then transmits the description of the animation to the JPIP server (arrow 2 from the Flash server to the JPIP server). These steps simultaneously illustrated by the arrows 2 enable the server, in accordance with the present invention, to start to prepare the JPIP increments even before the file in Flash format has been received by the client.

In a particular embodiment, the description of the animation contained in the original Flash file may be directly expressed in terms of JPIP requests. If the animation is not described in the form of JPIP requests, the JPIP server translates it into a series of JPIP requests. It then prepares the JPIP responses adapted to those successive JPIP requests.

Next, the Flash client notes the presence of a Flash animation of the type of that of FIG. 3. It then invokes the JPIP client (arrow 3) in order for the latter to retrieve the JPIP data from the JPIP server to reconstitute the animation considered (arrow 4). Continuation of the scenario consists in the transmission of JPIP responses from the JPIP server to the JPIP client (arrow 5). The latter finally performs two tasks (arrows 6):
- the decoding of the data received and the return of the images successively decompressed to the Flash client; and the storage of the JPIP data received in the cache of the JPIP client.

FIG. 7 illustrates the partial JPIP responses prepared in advance for the Flash animation processed, under the first embodiment of the invention.

The responses prepared in advance by the JPIP server consist of a series of return message headers, each being associated with an address pointing by means of pointers (ptr0, ptr1, ptr2, ptr3 in the drawing) to a position in the original JPEG2000 file. This address indicates the position, in the JPEG2000 file, of the segment of payload data to extract in order to form the body of the JPIP return message.

In what follows, for simplicity, only JPEG2000 files containing a single codestream are considered. The return message headers prepared by the server will thus have the following form: Bin-Id, Msg-Offset, Msg-Length.

FIG. 7 represents 8 precinct increments which have been prepared by the server. As the drawing shows, the first 4 messages prepared correspond to 4 increments contributing to the same precinct, identified by the value "Bin-ID". The 4 following increments contribute to another precinct, identified by the value "Bin-ID1".

Thus, as the headers of each message are already formed, it only remains for the server to concatenate each of them to the segment of data which corresponds to it in order to terminate constructing the message and transmit it.

Note that FIG. 7 illustrates fragmented precinct increments, that is to say that for a given precinct identifier, a plurality of precinct increments are pre-formed. For example, for the precinct having the identifier Bin-ID, 4 increments, corresponding to positions defined by the variables "Offset0", "Offset1", "Offset2" and "Offset3", respectively, are pre-formed. These four increments have respective lengths of payload data "Length0", "Length1", "Length2" and "Length3". Forming these four increments amounts to forming a single precinct increment, corresponding to the position defined by the variable Offset0, and having a length of payload data equal to: Length0+Length1+Length2+Length3, which, prima facie, would appear simpler. However, fragmenting the pre-formed responses into multiple precinct increments has a number of advantages, explained below.

Note that the JPIP requests translated from the Flash animation take different forms according to whether the JPIP server utilized is said to be "stateful" or not. A JPIP server is said to be stateful if it maintains a model of the client's cache. More specifically, a stateful JPIP server stores the JPIP data which it transmits to a given client, in the course of a session. The expression stateful session is also used. Consequently, during a stateful session, the client sends JPIP requests indicating solely the desired region of interest. At the session commencement, it nevertheless indicates the items already contained in its cache, if any, for the image considered. The client has no need to inform the server of the state of its cache, except if it deletes data from its cache. The stateful server is capable of transmitting only the JPIP data that are pertinent for that region of interest and which have not yet been received and stored in the client's cache. On the contrary, a "stateless" server does not memorize the data successively sent to a given client. In this case, the client sends requests indicating both the region of interest and the state of the client's cache with respect to that region of interest. This enables the client to avoid receiving JPIP data already present in its cache.

Fragmenting the pre-formed responses has in particular the following two advantages:

the JPIP server does not know in advance what will be the status of the client's cache at the moment of receiving the JPIP requests. In the case of a stateful server, this is true in particular at the moment of receiving the first request related to the animated sequence. In the case of a stateless server, this is true for all the requests for the sequence. Consequently, if the precinct increments formed are fragmented, the server can finely adjust its responses depending on the status of the client's cache. On the contrary, if only one increment had been pre-formed for each precinct, the server could not transmit a portion of the data constituting a given precinct;

in the case of a stateful or stateless server, generating fragmented increments enables the rate to be controlled. This is because optional fields ("ten", "layers" or "quality") of the JPIP requests aim to limit the quantity of information sent back by the server, in order to control the bandwidth occupied. Moreover, in a particular implementation, a JPIP server may itself decide to limit the size of its JPIP responses depending on the bandwidth available on the network. Fragmented precinct increments are also particularly practical in that case. Indeed, increments of short length make it possible to approach as closely as possible a size constraint set for a JPIP response, unknown at the moment of pre-forming the response.

Below there is described a simple possible strategy of generating fragmented precinct increments.

Advantageously, this strategy of generating fragmented precinct increments is independent of the request. This is because the contrary would risk giving rise to the transmission of compressed image data already present in the client's cache, which would be detrimental to the efficiency of the use of the JPIP protocol. A simple fragmentation strategy may consist of forming precinct increments containing exactly one quality layer.

However, if the packet corresponding to a given quality layer is empty, it is decided to insert it into the same increment as the packet of the quality layer above. If the packets of several successive quality layers are empty, they are all concatenated and grouped together in the same increment as the first non empty packet that follows. Finally, if the size of the series of bytes formed by a non empty packet, possibly concatenated with one or more empty packets, exceeds a certain threshold, that series of bytes is divided up into at least two portions. At least two increments are then generated containing the successive portions of that series of bytes. Advantageously, that division into a plurality of portions is always performed in the same manner by the server, in order for the fragmentation of the increments to be the same from one JPIP request to another. The threshold mentioned above, to decide on the division into several increments, depends on the underlying transport protocol utilized.

The flow chart of FIG. 8 illustrates the operation of the client in the first embodiment of the invention. Here the term client designates both the Flash and JPIP clients grouped together. Firstly, at a step 800, the client sends, at the user's request, via an Internet browser for example, a request to the remote server, with the aim of retrieving a Flash file. At the following step 802, the Flash client receives the requested data, reads them and displays the result via the man-machine interface.

Should the Flash file contain an animation consisting of a path within a JPEG2000 image (test 804 positive), that animation is processed by the JPIP client. The latter analyzes the animation and translates it in terms of JPIP requests (step 806). Note that as a variant, the animation contained in the Flash file may be directly expressed in terms of JPIP requests.

In this case, no translation into JPIP requests is necessary (step 806 is not in this case carried out).

Then the set of requests is gone through by initializing the current request to the first JPIP request of the sequence (step 808) and continuation of the algorithm consists, for the JPIP requests formed of which the response is not already entirely stored in the client's cache (test 810 negative), of successively sending those JPIP requests (step 812) and of receiving their respective responses. The JPIP data received are stored in the cache of the JPIP client. The JPIP client also decodes these compressed image data received and provides the successively reconstructed images to the FlashPlayer software for display (step 814). The Flash client then plays the desired video sequence progressively as the successive images are decoded and supplied to it.

So long as the current request is not the last request (test 816 negative), the following request is passed on to (step 818) and steps 810 to 816 are reiterated. When test 816 is positive (last request processed), the decoding of the images and the display of the animated sequence terminates (step 820).

At test 810, should the data already be entirely stored in the cache, test 816 is proceeded to directly.

At test 804, should the Flash file not contain any animation within a JPEG2000 image, the display of the Flash data ends (step 822) and the algorithm is terminated.

In the case of a stateful server, the client sends requests indicating solely the successive regions of interest linked to the animation processed, with the exception of the first request, as explained previously. In the case of a stateless server, the client sends requests indicating both the region of interest and the data-bin increments it desires in that region.

The flow chart of FIG. 9 illustrates the behavior of the server in the context of the first embodiment of the invention. Here the term server designates both the Flash and JPIP servers grouped together. However, in the drawing the steps performed by the Flash server and those performed by the JPIP server have been represented in two separate columns. The commencement of the algorithm consists of awaiting and then receiving a request of a Flash file sent by a Flash client (steps 900 and 902). The server replies in known manner to that request by transmitting the Flash file considered (step 904). Moreover, where an animation consisting of a path in a JPEG2000 image is included in the Flash file (test 906 positive), the Flash server provides the JPIP server with the animation considered (step 908) then the method resumes from step 900 of awaiting a new request. Where test 906 is negative, it is directly followed by a return to step 900.

The JPIP server translates that animation in terms of JPIP requests (step 910). It should be noted that as a variant, the animations within JPEG2000 images may be directly described in the form of JPIP requests. In that case, step 910 is not carried out. Continuation of the algorithm consists of forming the JPIP responses (step 912) to each JPIP request provided by the translation step 910. The responses are pre-formed according to the form illustrated by FIG. 7. It should be noted that for each precinct contributing to the region of interest linked to a request, the set of payload data included in the pre-formed increments contains all the quality layers of the precinct considered. The quantity of data to send for each precinct is decided later, depending on the rate constraint set by the JPIP client or decided by the server depending on the state of the client's cache. The increments already included in the client's cache are not transmitted.

Continuation of the algorithm executed by the JPIP server consists of awaiting the JPIP requests relating to the animation considered (step 914). At each reception of such a JPIP request (step 916), the server launches a procedure 90 for processing a JPIP request prepared in advance, framed by dashed lines in FIG. 9. Parallel to the launching of that processing procedure, the server once again awaits another JPIP request (return to step 914).

The processing of the JPIP requests prepared in advance by the JPIP server (frame 90) is now described.

The JPIP server already possesses pre-formed return messages in the form of partial precinct increments. The server thus determines, in known manner, for the current JPIP request, the set of the precinct increments to be transmitted (step 918). The corresponding return messages prepared in advance are noted {(bin_i,offset_i,length_i,ptr_i), i=0, . . . , num_messages−1}, where:

bin_i designates the identifier of the precinct concerned, offset_i designates the position of the first data byte of the precinct increment, length_i designates the number of bytes of payload data contained in the increment, ptr_i designates the pointer indicating the position of the corresponding segment of data in the JPEG2000 file considered and num_messages is the total number of return messages prepared in advance.

For each precinct increment so determined, the corresponding compressed image data are extracted from the initial JPEG2000 file (step 922). This extraction utilizes the pointer ptr_i, which is first of all positioned at the first precinct to be transmitted (initialization of the variable i to the value 0 at step 920). The extracted data segment is concatenated to the pre-formed header of the pre-formed return message (from which the pointer ptr_i is withdrawn) (finalization step 924). The increment so constituted is then ready to be transmitted (sending step 926). So long as the variable i is not the index of the last increment (test 928 negative), the value of the variable i is incremented by one unit (step 930) and steps 922 to 928 are reiterated. Once all the pertinent precinct increments have been transmitted (test 928 positive), the JPIP server terminates the pending JPIP response by an end of response message (step 932), in accordance with the JPIP standard. This terminates the procedure of processing the JPIP request. The response so formed had been prepared previously, which accelerates the procedure of processing JPIP requests. This is because the headers of all the precinct increments transmitted have already been formed, and the server merely adds the compressed data thereto. The latter consist of a series of bytes, referenced by the pre-formed increment, as described above.

FIG. 10 is a diagram of the content of the JPIP responses prepared in advance for a Flash animation, in a second particular embodiment of the invention. The return messages prepared here are complete, that is to say that the precinct increments formed contain a header, identical to that of the first embodiment, and a body containing data extracted from the original JPEG2000 file. An advantage of this embodiment with respect to the first is that the phase of extracting data from the original JPEG2000 file is carried out in advance. Thus, the server merely transmits the increments already completely formed to reply to the JPIP requests, which increases its responsiveness. On the other hand, the pre-formed JPIP return messages of course occupy a greater memory space.

It should be noted that the same strategy of fragmenting return messages as that described previously is adopted in this second embodiment. This procures the same advantages as those set forth previously.

The block diagram of FIG. 11 illustrates a third embodiment of the invention. This consists, for a Flash file containing an animation within a JPEG2000 image, of directly inserting JPIP responses corresponding to the animation considered in the Flash file, by utilizing for example the same type of JPIP return messages as those illustrated in FIG. 10. The insertion of the responses in the Flash file is performed at a pre-processing step. To do this, prior to any request from a client, the Flash server invokes the JPIP server (arrow 0 in the drawing) and provides it with the animated sequence destined to be transported within the Flash file. The JPIP server then constructs the corresponding return messages by extracting the necessary data from the original JPEG2000 file (arrow 1). The Flash and JPIP servers then form the Flash file integrally containing the JPIP response messages corresponding to the animated sequence considered (arrow 2). Thus, on reception of a client request to receive the Flash file (arrow 3), the JPIP data necessary for reconstructing the animation considered are transmitted following the Flash data (arrow 4), without waiting for any JPIP request from the client.

An advantage of this embodiment is that it makes it possible to avoid transmitting JPIP requests from the client to the server. This thus implies a reduction in the number of return trips between the client and the server, and thus an increase in the rapidity of transmission of the animated video sequence. On the other hand, the transmission of the JPIP data does not take into account the bandwidth available on the network or the status of the client's cache. This is because the data are inserted without knowing the state of these parameters. This embodiment can prove useful and provide good performance for example in the case of animations of short length, thus representing a restricted volume of data.

The invention claimed is:

1. A method of transmitting an animation of a digital image by a first server to a client, said transmission method comprising, in response to a reception by said first server of a request from said client for an animation descriptive file:
   transmitting said animation descriptive file stored in said first server to said client;
   determining whether the transmitted animation descriptive file includes an animation defined by a predefined series of portions of said digital image adapted to be transmitted by said first server by processing a series of requests to be received from said client and which correspond to said animation, said predefined series of portions of said digital image consisting of a path within said digital image and which has to be displayed by the client as an animated sequence of portions of image; and
   in case of positive determination only, transmitting the animation included in the animation descriptive file to a second server, said second server being enabled to prepare, upon receiving the animation included in the animation descriptive file and before receiving said series of requests from said client, a plurality of responses to a plurality of client requests, said plurality of client requests being obtained from said received animation.

2. The method according to claim 1, wherein said plurality of responses are a plurality of return message headers, and wherein each header is accompanied by a pointer to a beginning of a segment of payload data to associate with said header, said segment of payload data being stored at the second server.

3. The method according to claim 1, wherein said plurality of responses are a plurality of messages, and wherein each message includes a header and a body that includes compressed data.

4. The method according to claim 3, further comprising inserting said plurality of responses in a file containing said animation.

5. The method according to claim 2, further comprising fragmenting said segment of payload data.

6. The method according to claim 5, wherein said fragmenting includes cutting up a series of bytes of said segment of payload data into at least two portions, if a size of said series of bytes exceeds a predetermined threshold.

7. The method according to any one of claims 2-4, 6 and 1, wherein said image is encoded according to a JPEG2000 standard.

8. The method according to any one of claims 2-4, 6 and 1, wherein said animation is of a Flash type and said animation descriptive file is encapsulated in said animation.

9. The method according to claim 7, wherein a JPEG2000 Interactive Protocol (JPIP) transfer protocol is implemented.

10. A non-transitory computer-readable storage medium storing a computer-executable program that, when executed by a computer, causes the computer to perform a method according to any one of claims 2 to 4, 6 9, and 1.

11. A device that transmits an animation of a digital image by a first server to a client, said device comprising:
   a transmission unit that, in response to a reception by said first server of a request from said client for said animation descriptive file, transmits said animation descriptive file stored in said first server to said client; and
   a determining unit that determines whether the transmitted animation descriptive file includes an animation defined by a predefined series of portions of said digital image adapted to be transmitted by said first server by processing a series of requests to be received from said client and which correspond to said animation, said predefined series of portions of said digital image consisting of a path within said digital image and which has to be displayed by the client as an animated sequence of portions of image,
   wherein in case of positive determination only, said transmission unit transmits the animation included in the animation descriptive file to a second server, said second server being enabled to prepare, upon receiving the animation included in the animation descriptive file and before receiving said series of requests from said client, a plurality of responses to a plurality of client requests, said plurality of client requests being obtained from said received animation.

12. The device according to claim 11, wherein said plurality of responses are a plurality of return message headers, and wherein each header is accompanied by a pointer to a beginning of a segment of payload data to associate with said header, said segment of payload data being stored at the second server.

13. The device according to claim 11, wherein said plurality of responses are a plurality of messages, and wherein each message includes a header and a body that includes compressed data.

14. The device according to claim 13, further comprising an inserting unit that inserts said responses in a file containing said animation.

15. The device according to claim 12 or 13, further comprising a fragmenting unit that fragments said segment of payload data.

16. The device according to claim 15, wherein said fragmenting unit cuts up a series of bytes of said segment of payload data into at least two portions, if a size of said series of bytes exceeds a predetermined threshold.

17. The device according to any one of claims 11 to 13 and 15, wherein said image is encoded according to a JPEG2000 standard.

18. The device according to any one of claims 11 to 13 and 15, wherein said animation is of a Flash type and said animation descriptive file is encapsulated in said animation.

19. The device according to claim 17, wherein a JPEG2000 Interactive Protocol (JPIP) transfer protocol is implemented.

20. The device according to any one of claims 11 to 13, 15, and 18, wherein said device is incorporated in a communication apparatus.

* * * * *